(12) United States Patent
Almeida

(10) Patent No.: US 12,059,659 B2
(45) Date of Patent: Aug. 13, 2024

(54) SYSTEM AND METHOD FOR SOLVENT MIXING IN A CHROMATOGRAPHY SYSTEM

(71) Applicant: Waters Technologies Corporation, Milford, MA (US)

(72) Inventor: Neal Almeida, Cumberland, RI (US)

(73) Assignee: Waters Technologies Corporation, Milford, MA (US)

(*) Notice: Subject to any disclaimer, the term of this patent is extended or adjusted under 35 U.S.C. 154(b) by 454 days.

(21) Appl. No.: 17/241,255

(22) Filed: Apr. 27, 2021

(65) Prior Publication Data

US 2021/0339211 A1  Nov. 4, 2021

Related U.S. Application Data

(60) Provisional application No. 63/017,154, filed on Apr. 29, 2020.

(51) Int. Cl.

| | |
|---|---|
| *B01F 29/00* | (2022.01) |
| *B01D 15/18* | (2006.01) |
| *B01F 23/43* | (2022.01) |
| *B01F 23/70* | (2022.01) |
| *B01F 23/80* | (2022.01) |
| *B01F 29/15* | (2022.01) |
| *B01F 101/00* | (2022.01) |

(52) U.S. Cl.
CPC .............. *B01F 29/15* (2022.01); *B01D 15/18* (2013.01); *B01F 23/43* (2022.01); *B01F 23/708* (2022.01); *B01F 23/808* (2022.01); *B01F 2101/2204* (2022.01); *B01F 2215/0431* (2013.01); *B01F 2215/0481* (2013.01)

(58) Field of Classification Search
CPC ...... B01F 29/15; B01F 23/708; B01F 23/808; B01F 23/43; B01F 2101/2204; B01F 2215/0431; B01F 2215/0481
See application file for complete search history.

(56) References Cited

U.S. PATENT DOCUMENTS

| | | | |
|---|---|---|---|
| 4,165,360 A | 8/1979 | Casper et al. | |
| 4,501,501 A | 2/1985 | Edwards | |
| 2013/0260474 A1 | 10/2013 | Chan et al. | |
| 2015/0131405 A1* | 5/2015 | Zhou ................ | B01F 35/7176 366/144 |
| 2016/0184786 A1 | 6/2016 | De Corral et al. | |
| 2019/0022609 A1 | 1/2019 | Terada et al. | |

OTHER PUBLICATIONS

International Search Report and Written Opinion issued in International Application No. PCT/IB2021/053478 dated Jun. 28, 2021.

* cited by examiner

*Primary Examiner* — Anshu Bhatia
(74) *Attorney, Agent, or Firm* — WOMBLE BOND DICKINSON (US) LLP; Deborah M. Vernon; Mark R. Deluca

(57) ABSTRACT

A solvent mixing system includes a mixing tee, a centrifugal mixing path, and a low frequency blending mixer. The mixing tee has at least two solvent input ports and a solvent output port in fluid communication with one another. The centrifugal mixing path has a mixing path inlet in fluid communication with the solvent output port of the mixing tee. The centrifugal mixing path includes at least one coiled segment between the mixing path inlet and a mixing path outlet. The low frequency blending mixer is in fluid communication with the outlet of the centrifugal mixing path.

8 Claims, 7 Drawing Sheets

SYSTEM AND METHOD FOR SOLVENT MIXING IN A CHROMATOGRAPHY SYSTEM

RELATED APPLICATION

This application claims priority to U.S. Provisional Patent Application Ser. No. 63/017,154 entitled "SYSTEM AND METHOD FOR SOLVENT MIXING IN A CHROMATOGRAPHY SYSTEM," filed on Apr. 29, 2020, the content of which is hereby incorporated by reference in its entirety.

TECHNICAL FIELD

The present disclosure relates to chromatography and, in particular, to systems and methods for mixing solvents within a chromatography system.

BACKGROUND

In general, according to traditional techniques, different solvents within a chromatography system can be mixed within a mixer having two input ports for receiving the different solvent streams. A number of challenges can be encountered in attempting to properly blend the solvent streams. If the solvents are not blended properly, it may not be possible to integrate some chromatography peaks. In a two-input mixer, voids may exist at frit interfaces or at the mixing chamber bead bed, and these voids can cause stratification of the solvents and poor mixing. Although mixing quality can be increased by using a higher volume mixer, this may not be possible or desirable in some cases. A need, therefore, exists for a high efficiency mixer that prevents stratification and does not require increased mixing volume.

SUMMARY

In general, embodiments of the present technology are directed to mixing solvent streams within a chromatography system. In accordance with one aspect of the present disclosure, a solvent mixing system is disclosed. The solvent mixing system includes a mixing tee having at least two solvent input ports and a solvent output port in fluid communication with one another. The solvent mixing system also includes a centrifugal mixing path having a mixing inlet in fluid communication with the solvent output port of the mixing tee. The centrifugal mixing path includes at least one coiled segment between the mixing path inlet and a mixing path outlet. The solvent mixing system also includes a low frequency blending mixer in fluid communication with the outlet of the centrifugal mixing path. In some embodiments, the mixing tee has an internal mixing volume of about 0.045 uL. In some embodiments, the mixing tee is a low volume first in first out (FIFO) mixing point. In some embodiments, the mixing tee eliminates stratification of at least two solvent flow streams. In some embodiments, the centrifugal mixing path is contoured and shaped to impart a centrifugal force to a high velocity solvent mixture passing between the mixing path inlet and the mixing path outlet at a velocity between about 150 to 17,000 inch/min. In some embodiments, the centrifugal mixing path has an inner diameter between about 0.0005 to 0.090 inches. In some embodiments, the low frequency blending mixer is a single inlet mixer. In some embodiments, the low frequency blending mixer includes: a mixer input port in fluid communication with the outlet of the centrifugal mixing path; a first filter/retainer located downstream of the mixer input port; a mixing chamber; and a second filter/retainer located downstream of the mixing chamber. In some embodiments, the mixing chamber is a bead packed mixing chamber. In some embodiments, the mixing chamber is a diffusion bonded mixing chamber.

In accordance with another aspect of the present disclosure, a method for mixing solvent streams is disclosed. The method includes directing at least two solvent flow streams to a low volume mixing tee. The method also includes mixing the solvent flow streams within the low volume mixing tee to create a combined solvent stream. The method also includes guiding the combined solvent stream through a coiled centrifugal mixing path to impart a centrifugal force to the combined solvent stream. The method also includes further mixing the combined solvent stream using a low frequency blending mixer located downstream of the coiled centrifugal mixing path. In some embodiments, mixing the solvent flow streams within the low volume mixing tee eliminates stratification of the at least two solvent flow streams. In some embodiments, guiding the combined solvent stream through the coiled centrifugal mixing path imparts a centrifugal force to the combined solvent stream at a velocity between about 150 to 17,000 inch/min. In some embodiments, the centrifugal mixing path has an inner diameter between about 0.0005 to 0.090 inches. In some embodiments, the low frequency blending mixer is a single inlet mixer. In some embodiments, mixing the combined solvent stream using the low frequency blending mixer includes: filtering the combined solvent stream using a first filter located downstream of a mixer input port; mixing the combined solvent stream within a mixing chamber; and filtering the combined solvent stream using a second filter located downstream of the mixing chamber. In some embodiments, the mixing chamber is a bead packed mixing chamber. In some embodiments, the mixing chamber is a diffusion bonded mixing chamber, with multiple channels to create solvent mixing.

In accordance with another aspect of the present disclosure, a solvent mixing system is disclosed including a low volume first in first out (FIFO) mixing tee with an internal mixing volume of about 0.045 uL. The mixing tee includes at least two solvent input ports and a solvent output port in fluid communication with one another and configured to eliminate stratification of at least two solvent flow streams. The system also includes a coiled centrifugal mixing path in fluid communication with the output port of the mixing tee and configured to impart a centrifugal force to a combined solvent flow stream received from the mixing tee. The system also includes a low frequency single inlet blending mixer in fluid communication with the outlet of the centrifugal mixing path and configured to further mix the combined solvent flow stream downstream of the coiled centrifugal mixing path.

Various aspects of the present disclosure provide one or more of the following advantages. The use of the mixing tee, centrifugal mixing path, and blending mixer allows for the elimination of an integrated tee inlet at the blending mixer, eliminates voids within the mixer, and prevents stratification. In some embodiments, the combination of a mixing tee and final mixer with much smaller internal volumes can be used along with a centrifugal mixing path to provide the noise performance and mixing quality of a significantly larger mixer volume.

Other embodiments will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed exemplary embodiments of a diffuser assembly, reference is made to the accompanying figures, wherein.

DESCRIPTION OF EXEMPLARY EMBODIMENTS

The present disclosure relates to solvent mixing within a chromatography system. In some cases, the chromatography system is a liquid chromatography system, or a supercritical chromatography system. As discussed above, some traditional mixers can use, for example, a 50 uL mixer with two input ports for blending two solvents. If these solvents are blended efficiently, the user can integrate peaks on a UV detector with high resolution, and ideally a high signal to noise ratio. If mixing performance is poor, some chromatography peaks may not be integrated. In traditional two-input mixers, voids may exist at frit interfaces or at the bed of a beaded mixing chamber, and these voids can cause stratification of the solvents and poor mixing. Although mixing quality can be increased by using a higher volume mixer, this may not be possible or desirable in all cases.

According to some embodiments, the present disclosure relates to a solvent mixing system that includes a mixing tee, centrifugal mixing path, and a mixer arranged in series with one another. Individually, each of these three components has some mixing capability, and together they provide efficient solvent mixing without stratification and without a significant increase in volume.

In some embodiments, the mixing tee operates as a low volume, first in first out (FIFO) mixing point. Such a mixing point can eliminate stratification of the solvents. In one embodiment, the mixing tee can eliminate stratification within the combined analyte that exits the tee.

In some embodiments, the centrifugal mixing path can include a section of tube that includes one or more coils. When passing through the coils of the centrifugal mixing tube, centrifugal force creates turbulence in the combined solvent stream, adding additional packet mixing. In some embodiments, a diffusion bonded component or other type of centrifugal mixing path can be used instead of a tube. Any suitable pathway with the same or similar geometry can be used in place of a tube as the centrifugal mixing path.

In some embodiments, the blending mixer includes a bead mixer. Rather than utilizing a two-input mixer, the solvent is previously combined and partially mixed at the mixing tee and the centrifugal mixing path prior to entering the inlet of the blending mixer. Voids are no longer solvent stratification points due to premixing, according to this embodiment. In some embodiments, the blending mixer can include a diffusion bonded mixing chamber with multiple bore channels to create solvent blending.

When each of the mixing tee, centrifugal mixing path, and blending mixer are combined in series, the result is a solvent mixing system where each component complements the others. In some embodiments, a mixing tee and final mixer with much smaller internal volumes can be used along with a centrifugal mixing path to make a solvent mixing system which provides the noise performance and mixing quality of a significantly larger mixer volume.

Figure 1:
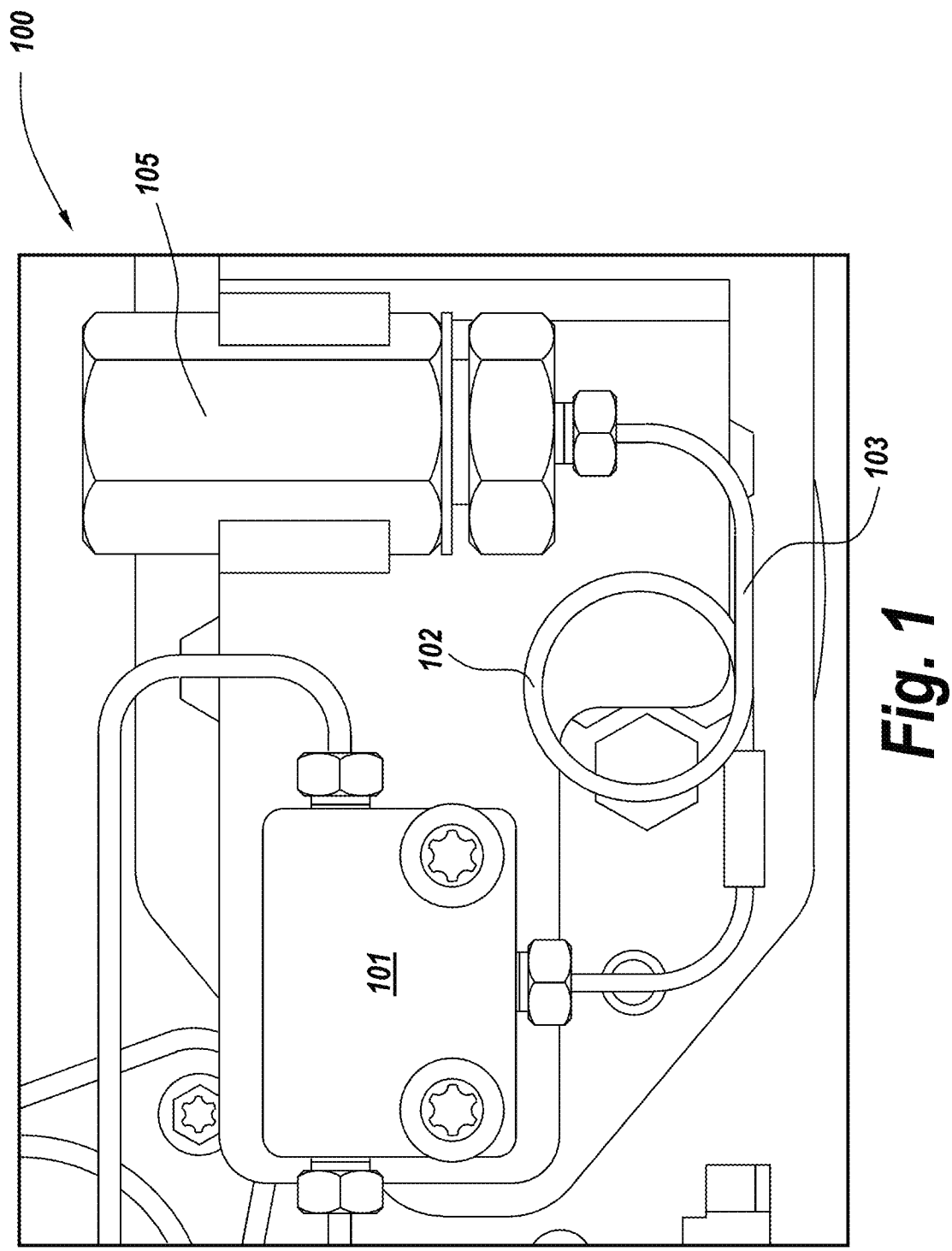
FIG. 1 illustrates an example solvent mixing system, according to embodiments of the present disclosure.

FIG. 1 illustrates an example solvent mixing system 100, according to embodiments of the present disclosure. In this embodiment, the solvent mixing system 100 includes a tee 101, a centrifugal mixing path 103, and a mixer 105 arranged in series with one another. Individually, each of these three components has some mixing capability.

In some embodiments, the mixing tee 101 operates as a low volume, high frequency, first in first out (FIFO) mixing point. Such a mixing point can eliminate stratification of the solvents. In one embodiment, at a flow rate of 0.5 mL/min (>10,000 packets/minute), the mixing tee 101 can have an internal mixing volume of about 0.045 uL. In some embodiments, the mixing tee 101 has an internal mixing volume between about 0.005 to 3.000 uL, and can cover a range with inner diameters between about 0.003 to 0.060 inches with a common length of about 0.045 inches. In some embodiments, the length could be between about 0.010 to 6 inches, depending on the constraints of the system.

In some embodiments, the centrifugal mixing path 103 can include a section of tube that includes one or more coils 102. When passing through the coils 102 of the centrifugal mixing path 103, centrifugal force creates turbulence in the combined solvent stream, adding additional packet mixing. In some embodiments, the combined solvent from the mixing tee 101 can be pumped through the centrifugal mixing path at a high velocity in order to promote turbulence and increase mixing. For example, the combined solvent stream from the mixing tee 101 can be pumped through the centrifugal mixing path 103 at a velocity between about 150 to 17,000 inch/min. In some embodiments, the centrifugal mixing path 103 has an inner diameter between about 0.0005 to about 0.090 inches. In one particular embodiment, the inner diameter of the centrifugal mixing path is about 0.005 inches. In some embodiments, the mixer design disclosed herein can be scaled for low micro flow rates at about 10 uL/min. or high flow applications up to about 1,000 mL/min.

In some embodiments, the blending mixer 105 includes a beaded mixer with a bead bed and a single fluid input. Rather than utilizing a two-input mixer, the solvent is previously combined and partially mixed at the mixing tee 101 and the centrifugal mixing path 103 prior to entering the inlet of the blending mixer 105. Voids are no longer solvent stratification points due to premixing, according to this embodiment. In some embodiments, the blending mixer 105 can include a diffusion bonded mixing chamber with multiple bore channels to create solvent blending, rather than a beaded mixing chamber. In some embodiments, the blending mixer can be a low frequency mixer that can operate in a range between 0.5 to 80.0 cycles/minute. In one particular embodiment, the blending mixer can operate at about 10 cycles/minute.

Figure 2:
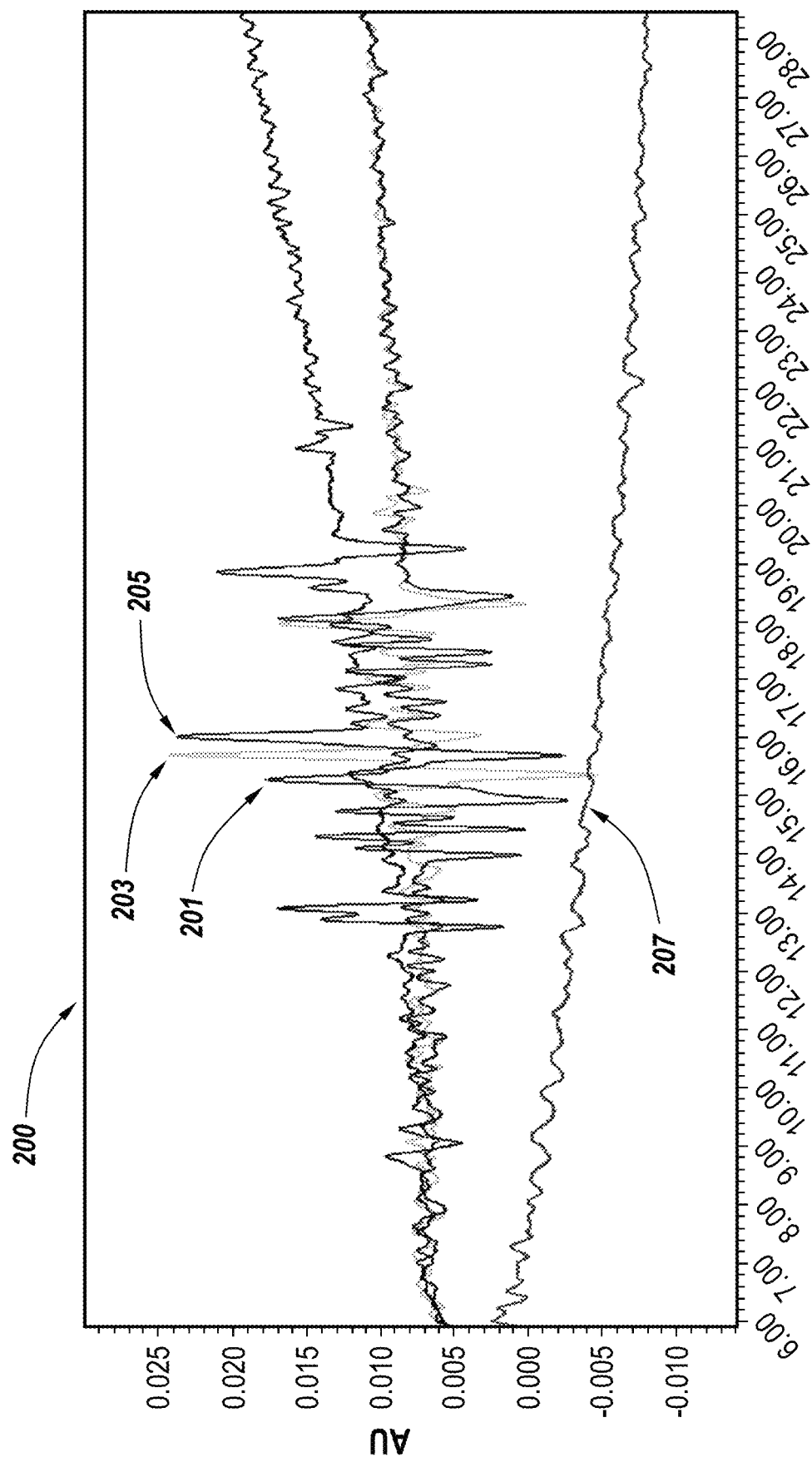
FIG. 2 is a plot of baseline results for two mixers, including the solvent mixing system of FIG. 1, according to embodiments of the present disclosure.

FIG. 2 is a plot 200 of baseline results for two mixers, including the solvent mixing system of FIG. 1, according to embodiments of the present disclosure. In this graph, the upper three traces 201, 203, 205 correspond to three runs on a traditional mixing device without the tee/tube/mixer combination, while the lower trace 207 corresponds to the tee/tube/mixer system of the present disclosure. It can be seen in this graph that the bottom baseline trace 207, which corresponds to the solvent mixing system of this disclosure, has significantly reduced noise compared to the traces 201, 203, 205 of the traditional systems. This noise reduction can significantly improve peak integration. In this embodiment, the top three traces 201, 203, 205 corresponding to a previous mixer system have significantly higher noise, especially in the time frame between 12 and 20 minutes. According to these previous techniques, if a chromatography peak lands between minute 12 and minute 20, peak integration may be very difficult and results may be compromised.

Figure 3A:
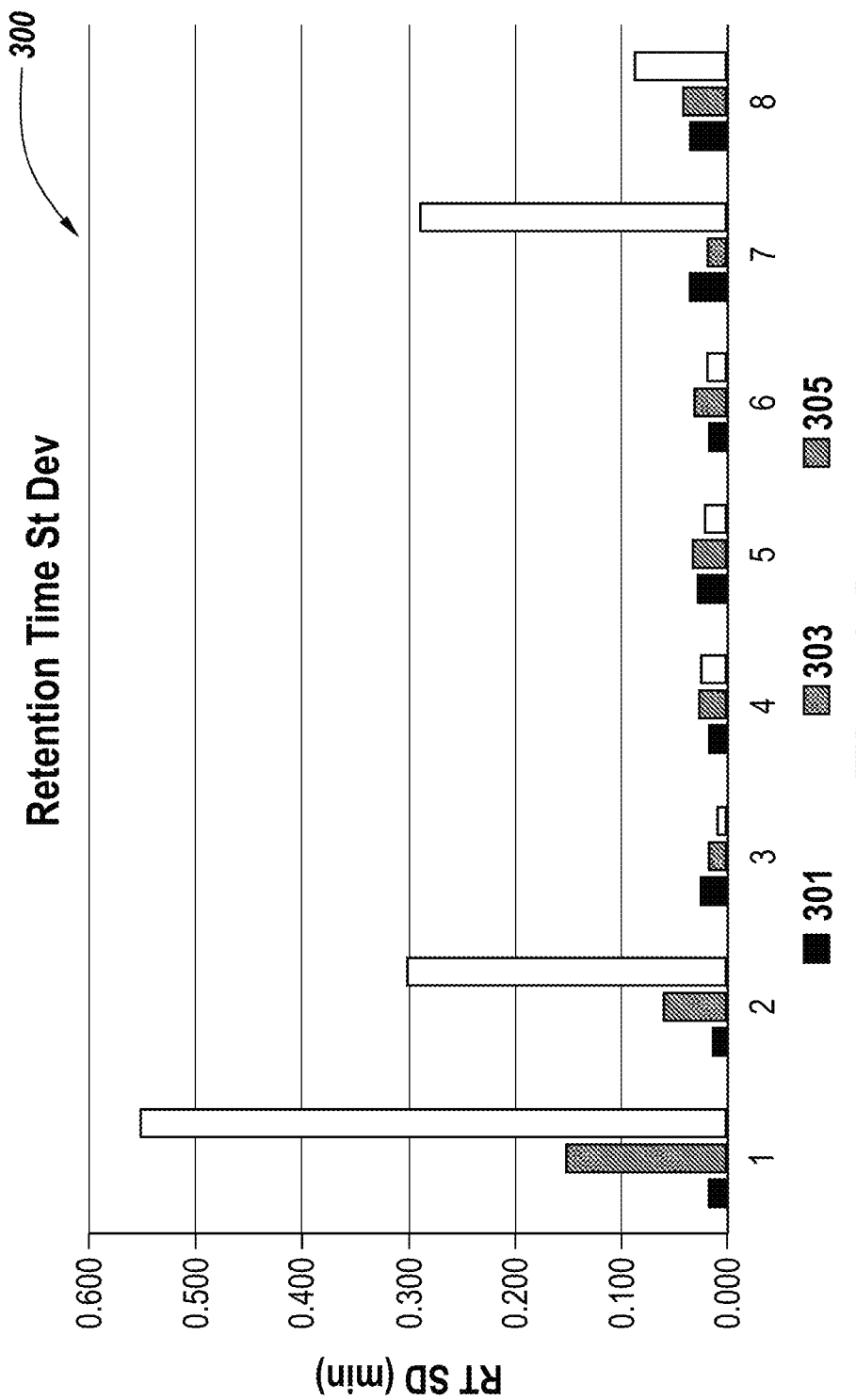
FIG. 3A shows a comparison plot of retention time standard deviation for two traditional systems, and the solvent mixing system of FIG. 1, according to embodiments of the present disclosure.

FIG. 3A shows a comparison plot 300 of retention time standard deviation for two traditional systems, and the solvent mixing system of FIG. 1, according to embodiments of the present disclosure. The retention time standard deviation for a system using a different style mixer is illustrated at 303, while the retention time standard deviation for another system using a different mixer is illustrated at 305. The retention time standard deviation for the tee/tube/mixer system of the present disclosure is illustrated at 301. In this embodiment, it can be seen that the mixing system according to the present disclosure, which includes a 50 uL mixing tee, a centrifugal mixing path, and a single input mixer, demonstrates a significantly lower retention time standard deviation 301. This decrease in retention time standard deviation can be the result of the combination of the three elements disclosed herein, and increased performance by the single input mixer. In this example, the comparison was performed using a flow rate of 0.2 mL/min.

Figure 3B:
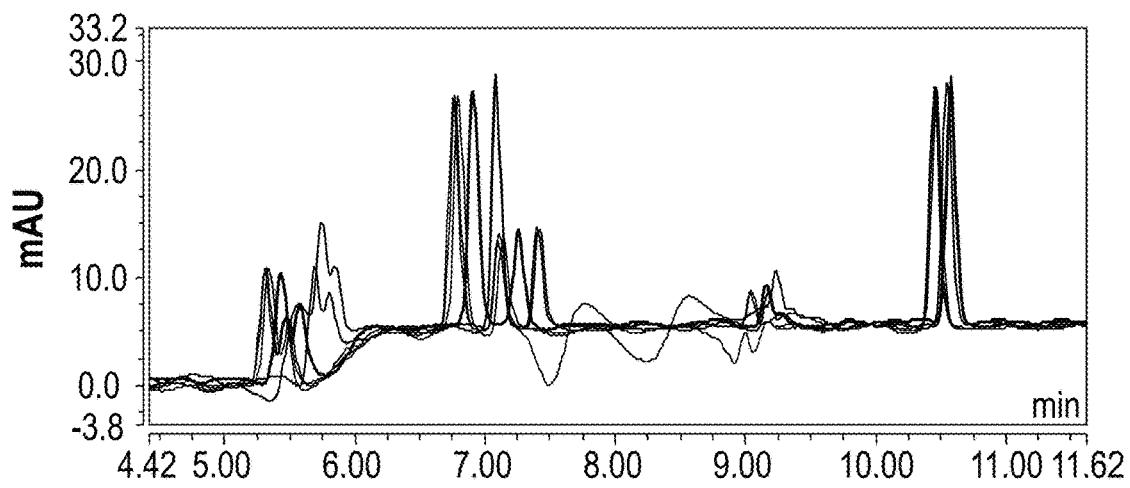
FIGS. 3B-3D show a comparison of baseline results for three different mixers, including the solvent mixing system of FIG. 1, according to embodiments of the present disclosure.
Figure 3C:
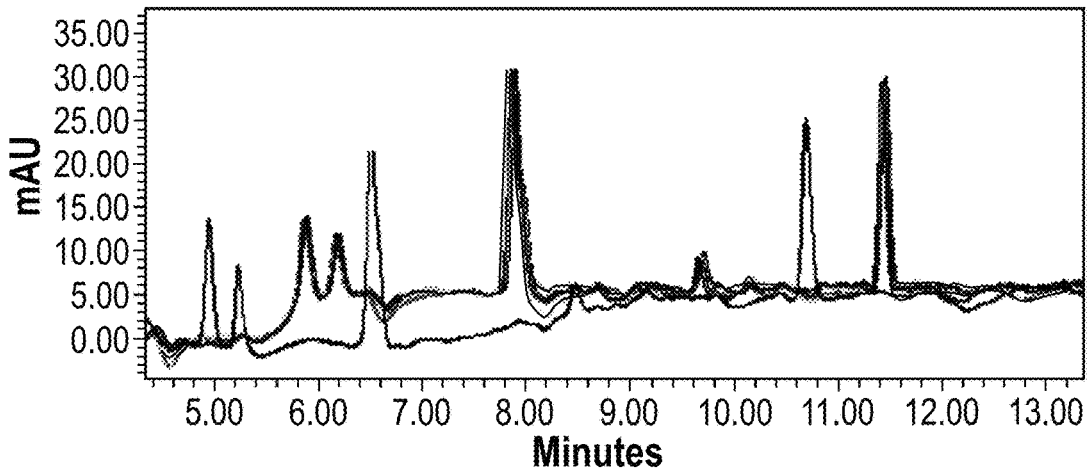
Figure 3D:
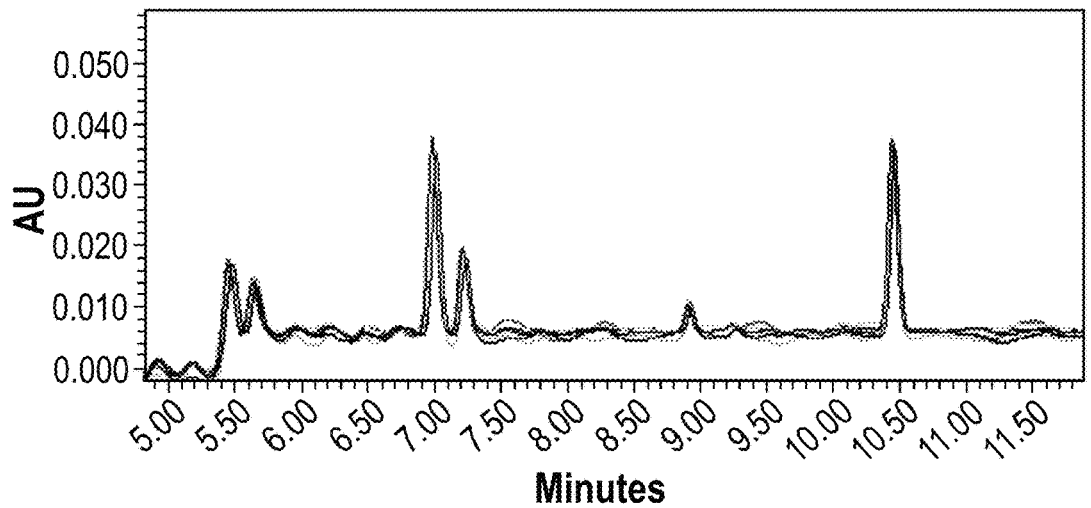

FIGS. 3B-3D show a comparison of baseline results for three different mixers, including the solvent mixing system of FIG. 1, according to embodiments of the present disclosure. The baseline results for a first different system design are illustrated in FIG. 3B, the baseline results for a second different system are illustrated in FIG. 3C, and the baseline results for the mixing system according to the present disclosure are illustrated in FIG. 3D. While the baselines illustrated in FIGS. 3B and 3C are not necessarily noisy, they are significantly erratic and include substantial drift. This makes peak integration difficult. In comparison, the baseline of the present system illustrated in FIG. 3D eliminates some of this unwanted behavior.

Figure 4:
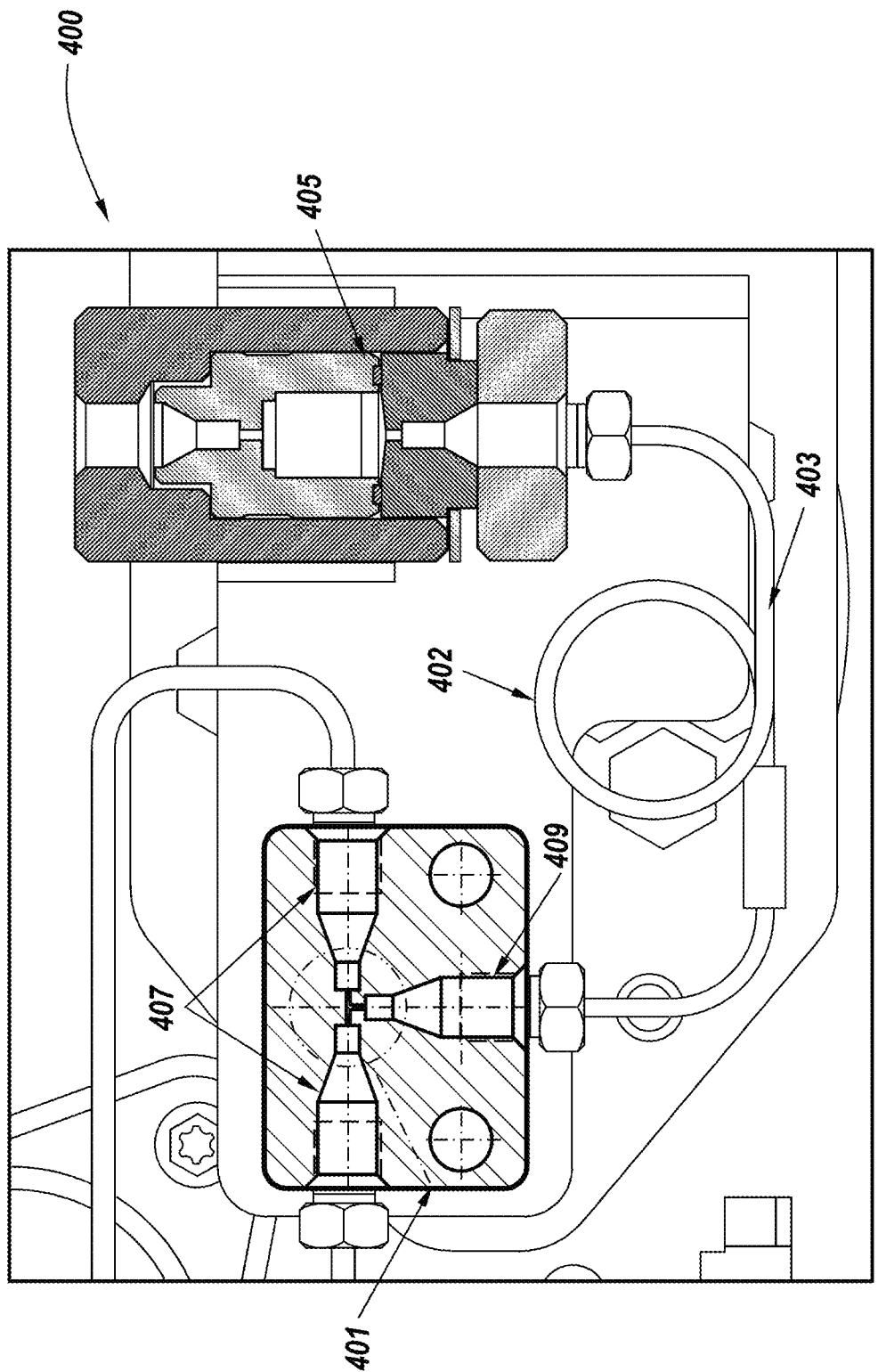
FIG. 4 illustrates another example solvent mixing system, according to embodiments of the present disclosure.

FIG. 4 illustrates another example solvent mixing system 400, according to embodiments of the present disclosure. In this embodiment, the solvent mixing system 400 includes a tee 401, a centrifugal mixing path 403 having a number of coils 402, and a mixer 405 arranged in series. In some embodiments, the mixing tee 401 operates as a low volume, high frequency, first in first out (FIFO) mixing point with an internal mixing volume of about 0.045 uL. In some embodiments, the mixing tee 401 has an internal mixing volume between about 0.005 to 3.000 uL, and can cover a range of tubing having inner diameters between about 0.003 to 0.060 inches with a common length of about 0.045 inches. In some embodiments, the length could be between about 0.010 to 6 inches, depending on the constraints of the system. In this embodiment, the mixing tee 401 includes at least two solvent input ports 407 and a solvent output port 409 in fluid communication with one another and configured to eliminate stratification of at least two solvent flow streams.

The centrifugal mixing path 403 is in fluid communication with the output port 409, and includes a number of coils 102 that can impart a centrifugal force to a combined solvent flow stream received from the mixing tee 401. When passing through the coils 402 of the centrifugal mixing path 403, centrifugal force creates turbulence in the combined solvent stream, adding additional packet mixing. In some embodiments, the centrifugal mixing path 403 has an inner diameter between about 0.0005 to about 0.090 inches. In one particular embodiment, the inner diameter of the centrifugal mixing path 403 is about 0.005 inches. The centrifugal mixing path 403 can include a single coil, or multiple coils, depending on the application, and the number and compactness of the coils can be dependent upon the solvents being mixed, or other application specific factors. In some embodiments, the combined solvent from the mixing tee 401 can be pumped through the centrifugal mixing path 403 at a velocity between about 150 to 17,000 inch/min.

In some embodiments, the blending mixer 405 includes a low frequency single inlet mixer located downstream of the coiled centrifugal mixing path 403. In some embodiments, the blending mixer 405 can be a low frequency mixer that can operate in a range between 0.5 to 80.0 cycles/minute. The blending mixer 405 can have a beaded or a diffusion bonded mixing chamber with multiple bore channels to create solvent blending, in some embodiments.

Figure 5:
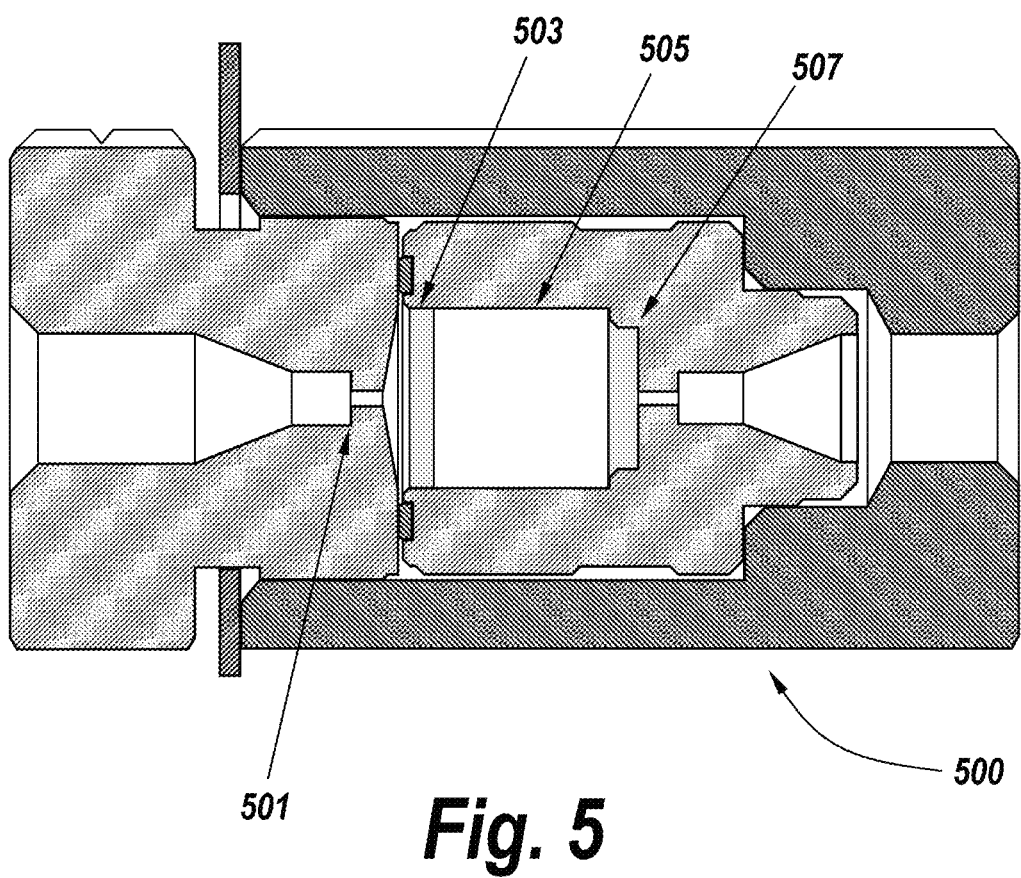
FIG. 5 illustrates an example single inlet mixer, according to embodiments of the present disclosure.

FIG. 5 illustrates an example single inlet mixer 500, according to embodiments of the present disclosure. In this embodiment, the mixer 500 includes a single input 501 that is in fluid communication with the centrifugal mixing path. The input 501 can be made of titanium, stainless steel or any suitable material for chemical compatibility according to some embodiments. The mixer 500 also includes a first filter/retainer 503 upstream of a mixing chamber 505 and a second filter/retainer 507 downstream of the mixing chamber 505. In some embodiments, the mixer 500 can be a 100 uL mixer. The mixing chamber 505 can be a beaded mixing chamber or a diffusion bonded mixing chamber multiple bore channels to create solvent blending, according to some embodiments. Without the need for a two-input mixer, there are no voids which create stratification among the solvent stream.

Figure 6:
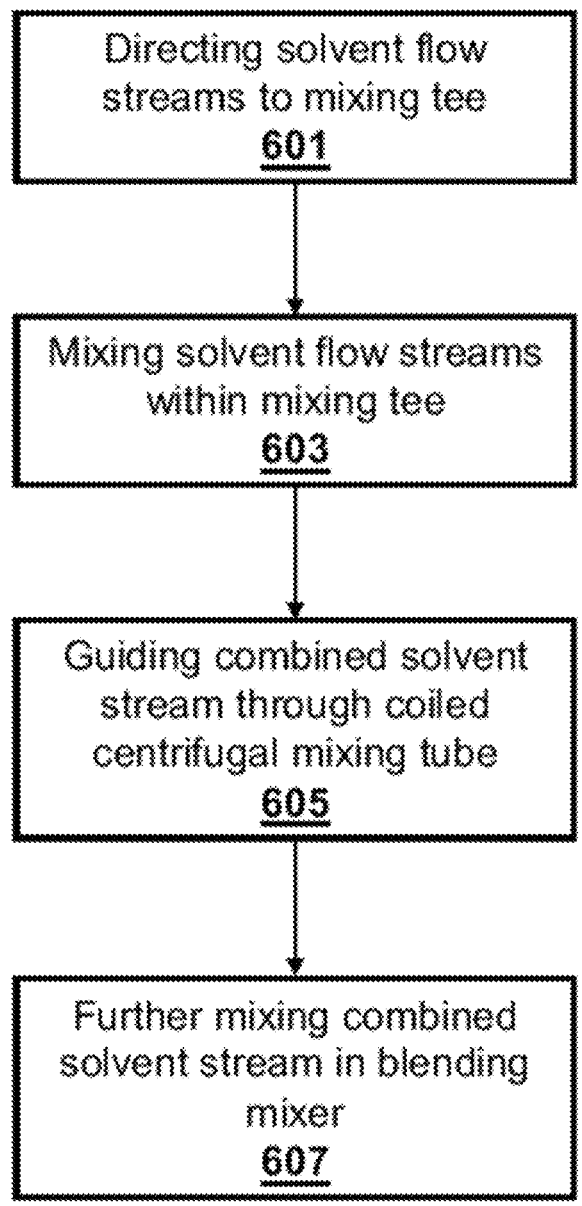
FIG. 6 is a flow chart illustrating an example method for mixing solvent streams, according to an embodiment of the present disclosure.

FIG. 6 is a flow chart illustrating an example method 600 for mixing solvent streams, according to an embodiment of the present disclosure. In this particular embodiment, the method begins with directing 601 at least two solvent flow streams to a low volume mixing tee. The method then proceeds with mixing 603 the solvent flow streams within the low volume mixing tee to create a combined solvent stream. In some embodiments, mixing the solvent flow streams within the low volume mixing tee eliminates stratification of the solvent flow streams. In some embodiments, the mixing tee has an internal mixing volume between about 0.005 to 3.000 uL, and can cover a range of tubing having inner diameters between about 0.003 to 0.060 inches with a common length of about 0.045 inches. In some embodiments, the length could be between about 0.010 inches to about 6 inches, depending on the constraints of the system.

The method continues with guiding 605 the combined solvent stream through a coiled centrifugal mixing path to impart a centrifugal force to the combined solvent stream. In some embodiments, the centrifugal mixing path is contoured and shaped to impart a centrifugal force to a high velocity solvent mixture passing between the mixing path inlet and the mixing path outlet at a velocity between about 150 to 17,000 inch/min. In some embodiments, the centrifugal mixing path has an inner diameter between about 0.0005 to about 0.090 inches. In one example embodiment, the inner diameter of the centrifugal mixing path is about 0.005 inches. In some embodiments, the mixer design disclosed herein can be scaled for low micro flow rates at about 10 uL/min, or high flow applications up to about 1,000 mL/min.

The method continues with further mixing 607 the combined solvent stream using a low frequency blending mixer located downstream of the coiled centrifugal mixing path. In some embodiments, the blending mixer can operate in a range between 0.5 to 80.0 cycles/minute. In some embodiments, the blending mixer is a single inlet mixer that operates at about 10 cycles/minute. In some embodiments, further mixing the combined solvent stream using the blending mixer includes filtering the solvent stream using a first filter located downstream of a mixer input port, mixing the solvent stream within a mixing chamber, and filtering the solvent stream using a second filter located downstream of the mixing chamber.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the operations in the exemplary flowcharts may be performed in a different order than the order shown. Moreover, while exemplary embodiments within this disclosure have been shown and described with references to particular embodiments, those of ordinary skill in the art will understand that various substitutions and alterations in form and detail may be made without departing from the scope of the present disclosure. Further still, other aspects, functions and advantages are also within the scope of the present disclosure.

What is claimed is:

1. A solvent mixing system comprising:
   a mixing tee having at least two solvent input ports and a solvent output port in fluid communication with one another;
   a centrifugal mixing path having a mixing path inlet in fluid communication with the solvent output port of the mixing tee, the centrifugal mixing path including at least one coiled segment between the mixing path inlet and a mixing path outlet; and
   a low frequency blending mixer in fluid communication with the outlet of the centrifugal mixing path, wherein the low frequency blending mixer is a single inlet mixer and comprises:
      a mixer input port in fluid communication with the outlet of the centrifugal mixing path;
      a first filter/retainer located downstream of the mixer input port;
      a mixing chamber; and
      a second filter/retainer located downstream of the mixing chamber.

2. The solvent mixing system of claim 1, wherein the mixing tee has an internal mixing volume of about 0.045 uL.

3. The solvent mixing system of claim 1, wherein the mixing tee is a low volume first in first out (FIFO) mixing point.

4. The solvent mixing system of claim 1, wherein the mixing tee eliminates stratification of at least two solvent flow streams.

5. The solvent mixing system of claim 1, wherein the centrifugal mixing path is contoured and shaped to impart a centrifugal force to a high velocity solvent mixture passing between the mixing path inlet and the mixing path outlet at a velocity between about 150 to 17,000 inch/min.

6. The solvent mixing system of claim 1, wherein the centrifugal mixing path has an inner diameter between about 0.0005 to 0.090 inches.

7. The solvent mixing system of claim 1, wherein the mixing chamber is a bead packed mixing chamber.

8. The solvent mixing system of claim 1, wherein the mixing chamber is a diffusion bonded mixing chamber.

* * * * *